United States Patent [19]
Hensley

[11] Patent Number: 6,161,453
[45] Date of Patent: *Dec. 19, 2000

[54] SAW CHAIN SHARPENER FOR A CHAIN SAW

[75] Inventor: Kenneth M. Hensley, St. Albans, W. Va.

[73] Assignee: Chain Masters, Inc., Cross Lanes, W. Va.

[*] Notice: This patent issued on a continued prosecution application filed under 37 CFR 1.53(d), and is subject to the twenty year patent term provisions of 35 U.S.C. 154(a)(2).

[21] Appl. No.: 09/016,325

[22] Filed: Jan. 30, 1998

[51] Int. Cl.$^7$ .................................................. B23D 63/16
[52] U.S. Cl. ...................... 76/38; 76/31; 76/36; 76/82; 76/88; 451/423; 30/123.4; 30/381; 30/138
[58] Field of Search .................... 30/123.4, 381, 30/383, 514, 515, 138; 76/31, 36, 81.5, 82, 88, 24.1, 112, 38; 451/439, 419, 423; 83/174.1

[56] References Cited

U.S. PATENT DOCUMENTS

| | | |
|---|---|---|
| 2,651,336 | 9/1953 | Warren . |
| 2,859,642 | 11/1958 | Travis ......................... 76/31 |
| 2,896,481 | 7/1959 | Hebbert ....................... 76/31 |
| 3,038,355 | 6/1962 | Granberg ..................... 76/31 |
| 3,040,602 | 6/1962 | Carlton ........................ 76/38 |
| 3,172,306 | 3/1965 | Kephart, Jr. ................. 76/36 |
| 3,227,007 | 1/1966 | Kingcannon ................ 76/31 |
| 3,322,000 | 5/1967 | Newman ..................... 76/36 |
| 3,526,156 | 9/1970 | Condon et al. . |
| 3,543,612 | 12/1970 | Silvon ......................... 76/31 |
| 4,404,871 | 9/1983 | Fritz et al. ............... 76/36 X |
| 4,404,872 | 9/1983 | Fritz ....................... 76/36 X |
| 4,597,178 | 7/1986 | Dolata et al. ............. 30/138 |
| 4,821,608 | 4/1989 | Reed ......................... 76/36 |

*Primary Examiner*—Rinaldi I. Rada
*Assistant Examiner*—Boyer Ashley
*Attorney, Agent, or Firm*—Arent Fox Kintner Plotkin & Kahn PLLC

[57] ABSTRACT

A saw chain sharpener for a chain saw and a chain saw having a sharpener in which the bottom surfaces of the cutting teeth of a conventional bottom sharpened saw chain are conveniently sharpened automatically by running the chain under power through the sharpener. The saw chain can be sharpened using the sharpener in a matter of typically twenty to thirty seconds without removing the chain from the chain bar. The sharpener is preferably adapted to be removably mounted to a bracket which is itself preferably removably disposed on the chain saw. The sharpener comprises a sharpening tooth disposed in a housing which is mounted on the chain bar. A top surface of the sharpening tooth frictionally engages bottom surfaces of the cutting teeth of the chain as the chain is run under power. A device for dispensing a sharpening compound to the sharpening tooth during sharpening may be disposed on the sharpener housing.

32 Claims, 6 Drawing Sheets

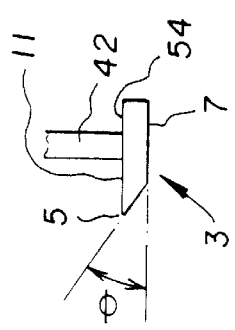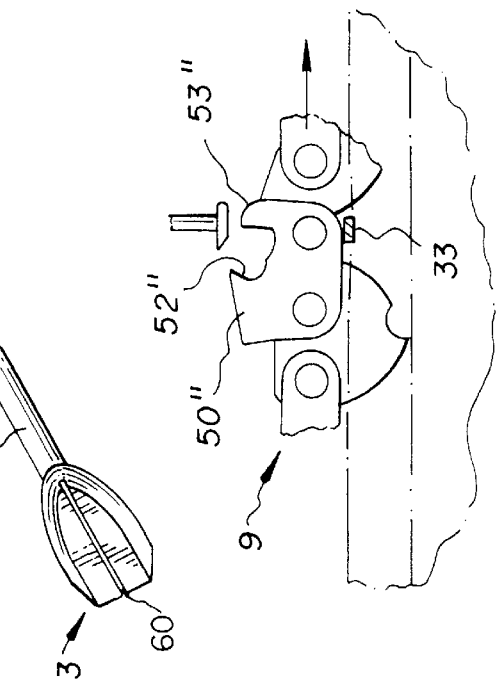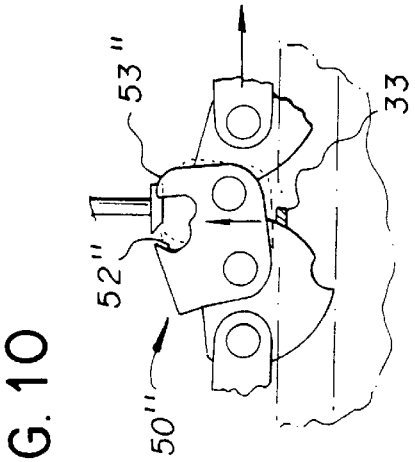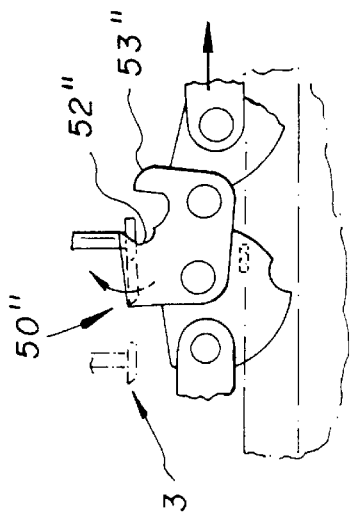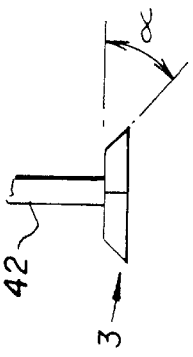

SAW CHAIN SHARPENER FOR A CHAIN SAW

BACKGROUND OF THE INVENTION

1. Field of the Invention

The present invention relates generally to portable chain saw sharpening devices, in which the sharpener is preferably adapted to be removably mounted to a bracket disposed on the chain saw. In particular, the present invention is directed to a bottom sharpening chain saw sharpener, in which the bottom surfaces of the cutting teeth of a conventional bottom sharpened saw chain are conveniently sharpened without disturbing the top surfaces of the saw chain elements, including the depth gauge lifting member disposed forward of each cutting tooth. The saw chain is sharpened by running the chain under power through the sharpener so as to sharpen the cutting teeth of the saw chain quickly, preferably in a matter of twenty to thirty seconds, without removing the chain from the chain bar.

2. Description of the Prior Art

Maintaining the sharpness of a chain saw is particularly important for maintaining cutting efficiency and for preventing injuries which can result from snagging the chain as a result of dull cutting teeth. It is well known that a saw chain can become dull quite quickly when the chain saw is used for moderate to heavy jobs, and it is not uncommon for the chain in heavy use to require sharpening twice in one day. Therefore, a method and apparatus for sharpening a saw chain quickly and conveniently is important to minimize down time on any particular job. It is preferable that the saw chain can be sharpened without removing the chain from the saw, in order to reduce the time and trouble necessary to sharpen the chain. In addition, it is desirable for the sharpener to be easily portable, so that the sharpener can be brought along to remote jobs where a chain saw is often used. It is also preferable that the cutting teeth of the saw chain are able to be sharpened all at one time, without having to pay individual attention to each of the cutting teeth on the saw chain. It is important for a chain sharpener to be able to bottom sharpen a conventional saw chain, wherein the bottom surfaces of the cutting teeth are ground or honed, so as to avoid the use of top sharpening saw chains, which are rather uncommonly used in commercially available chain saws.

Large industrial sized machines are available for sharpening saw chains, but these devices require removing the chain from the saw and leaving the chain for sharpening by an experienced professional for later pick-up. It is obvious that this method is time consuming and inconvenient, and requires the intensive chain saw user to keep a number of extra chains on hand so that in the field a sharp chain is readily available to replace a dull chain.

A number of devices exist which aid the chain saw user in sharpening the saw chain while the chain remains on the saw. Such devices commonly employ a fixture, which must be clamped over the chain bar to aid in aligning a hand file to the proper pitch for sharpening each of the cutting teeth. U.S. Pat. No. 4,404,871, "Portable Chain Saw Sharpening Kit With Cutting Link Alignment Means and Method for Using Same" to Fritz et al. discloses a chain sharpener in which the cutting surfaces of each of the cutting teeth are individually sharpened using a hand powered rotary burr. The burr is inserted into one of two guide bores, depending upon whether a left or right bottom sharpened cutting tooth is to be sharpened, and the fixture is moved from tooth to tooth as each of the bottom surfaces of the cutting teeth are sharpened. While this device has the advantage that it is simple in construction and is easily portable for use in the field, the device requires a large amount of time and effort to individually sharpen by hand each of 20 to 30 cutting teeth disposed on the chain.

Accordingly, a number of "self-sharpening" chain saws have been developed in which a sharpener is built into the housing of the chain saw such that the chain is either automatically sharpened as the saw is used or the chain is sharpened whenever the user actuates a sharpening lever. However, all of these sharpeners are top sharpening devices in which a special chain having cutting teeth with sharpenable surfaces on a top surface must be used. In the typical self-sharpening device, an abrasive element is disposed in the housing of the chain saw adjacent to the drive sprocket, and the abrasive element is applied to top surfaces of the cutting teeth to grind a new edge as the chain is run under power around the chain bar. Typical devices of this type are disclosed in U.S. Pat. Nos. 3,526,156; 4,506,565, 3,301,098; 3,040,602; and 4,457,069.

A typical self-sharpening device is disclosed in U.S. Pat. No. 3,526,156, "Saw Chain Sharpener Means" by Condon et al., in which an arcuate sharpening stone is disposed in the housing of the chain saw adjacent to the drive sprocket, such that a button positioned on the top of the chain saw housing can be depressed to bring the grinding stone into contact with the top of the chain as the chain moves around the sprocket under power. Naturally, only the top surfaces of the cutting teeth can be sharpened by the sharpening stone, so that such devices are only useful when a top sharpening saw chain is employed on the chain saw. Thus, a saw chain of the type which is ordinarily used on most commercially available chain saws, in which bottom surfaces of the cutting teeth are ground to produce the cutting edge, cannot be used on this type of self-sharpening chain saw. Another problem arises with the self-sharpening chain saw because the grinding wheel soon becomes worn away, resulting in non-uniform sharpening of the saw chain teeth. When this occurs, both the saw chain and the sharpening element must be replaced.

U.S. Pat. No. 3,435,860, "Top Sharpening Floating Sprocket Chain Saw" to Silvon, discloses an arcuately shaped sharpening member having a curvature approximately identical to the curvature of the drive sprocket. The curved sharpening member is disposed in the chain saw housing adjacent the sprocket, and the sharpening member is designed to be urged by an actuator or key to engage the saw chain. The sharpening member can be pressed by the operator against the top surfaces of the cutting teeth at the location of the chain sprocket so as to uniformly grind the top surfaces of the cutting teeth while the chain is powered around the chain bar. In so doing the sharpening member grinds not only the top surfaces of the cutting teeth but also grinds and reduces the height of the depth gauge members disposed just forward of each cutting tooth.

Another type of top sharpening saw chain sharpener is disclosed in U.S. Pat. No. 4,597,178, "Saw Chain Sharpener" to Dolata et al., in which an arcuate grinding element is disposed in the front portion of an elongated chain guard casing which can be removably disposed over the chain bar. In this sharpener, the grinding element is disposed in the cavity at the front of the casing and a knob disposed behind the grinding element is used to press the element onto the top of the chain while the chain is powered around the chain bar. This sharpener is also a top sharpening device which sharpens the top surfaces of the cutting teeth and also reduces the length of the depth gauges, as does the Silvon device.

Because this sharpener is not disposed in the chain saw housing, presumably the chain saw can be made lighter than those devices which incorporate the sharpening lifting member and the necessary supporting structure in the housing. However, as with all of the "self sharpening" devices described above, the Dolata et al. sharpener sharpens only the top surfaces of the cutting teeth, and the height of the depth gauge lifting member is reduced at every sharpening.

A detailed disclosure of a top sharpening saw chain is provided in U.S. Pat. No. 3,269,431, "Chain Saw Sharpening Mechanism" to Ehlen, in which a chain saw having an abrasive element disposed in the vicinity of the drive sprocket is brought into contact with the top surfaces of a chain with cutting teeth specially designed to be sharpened from the top. In order to sharpen the cutting teeth so that trailing ends of the teeth are ground to a greater extent than the leading ends, the sprocket in Ehlen is arranged to have cams which cant the teeth as they move around the sprocket, so as to present the proper grinding angle to the sharpening lifting member.

However, none of the devices discussed above are capable of "automatically" sharpening the bottom surfaces of the cutting teeth of the bottom sharpening saw chains which are most commonly used on chain saws commercially available to professionals and hobbyists. Devices previously known in the art in which the bottom surfaces of the cutting teeth can be sharpened have been limited to manual devices in which each tooth is sharpened one at a time by hand while the chain remains on the bar, or automatically by industrial sized devices which sharpen the chain after removal from the chain bar. The difficult problem of sharpening the bottom surface of the cutting teeth while the saw is running using a portable preferably removable sharpener has not been solved by devices previously known in the art.

SUMMARY OF THE INVENTION

In accordance with the present invention, a portable saw chain sharpener for a chain saw comprises a housing having a recess; a device for removably attaching the housing to the chain bar; a sharpening device disposed in the recess for sharpening the bottom surfaces of the cutting teeth; and lifting device for lifting the cutting teeth to a sharpening position, at which position the bottom surfaces of the cutting teeth engage the sharpening device, so that the cutting teeth are bottom sharpened when the chain saw is operated. The sharpening device comprises a shaft disposed in the recess; and a sharpening tooth having a top surface and a bottom surface, wherein the sharpening tooth is disposed on a bottom end of the shaft, and wherein the top surface of the sharpening tooth is positioned to frictionally engage the bottom surface of the teeth to bottom sharpen the cutting teeth when the chain saw is operated. The sharpening tooth is preferably made of hardened steel, although it may be made from any material which is hard enough to grind or hone the cutting teeth of the chain, and may include a ceramic material, and may have a coating, such as of titanium nitride or the like, to improve surface hardness.

The lifting device comprises left and right lifting members movably disposed on left and right side walls of the housing, wherein the chain passes over the lifting members to cause the bottom surfaces of the cutting teeth to frictionally engage the top surface of the sharpening tooth as the chain moves along the chain bar. The sharpener is placed on the chain bar by first moving the lifting members into an open position so as to allow the sharpener recess to receive the chain and chain bar, and the sharpener is then secured to the mounting bracket disposed on the bar. The operator then lifts the chain while closing the lifting members, so that the chain passes over top surfaces of the lifting members, and the cutting teeth of the chain are in a sharpening position, so that bottom surfaces of the cutting teeth can frictionally engage the top surface of the sharpening tooth. The operator then runs the chain saw for a period of from five seconds to one minute, during which time the operator may apply a sharpening compound to the sharpening tooth by means of a sharpening compound reservoir disposed on a top surface of the sharpener. However, application of the sharpening compound is not necessary to sharpen the cutting teeth, but merely improves the sharpening efficiency of the sharpener.

The chain saw sharpener of the present invention provides a number of advantages over the prior art. The sharpener is designed to sharpen the teeth of a bottom sharpened saw chain, which is the type most commonly supplied and used with commercially available saws. Moreover, it is not necessary to remove the chain from the bar. The time required to sharpen the chain is between five seconds and one minute, and ordinarily the chain can be sharpened in a matter of typically twenty to thirty seconds by running the chain under power through the sharpener. The sharpener can then be conveniently and quickly removed from the saw. The chain saw can be electrically powered or powered by an internal combustion engine.

The device for removably attaching the housing to the chain bar comprises a mounting bracket adapted to be mounted to the chain bar, and a device for removably attaching the housing to the mounting bracket. The mounting bracket comprises first and second side walls which define a channel for receiving the chain bar; and a clamping device disposed in at least one of the side walls of the mounting bracket for holding the mounting bracket firmly on the chain bar. Alternatively, the bracket may comprise an L-shaped lifting member adapted to be attached to one side of the chain bar.

The saw chain sharpener may also include a device for delivering a sharpening compound to the sharpening tooth during sharpening, which is designed to improve the sharpening efficiency of the sharpener. However, it is not necessary to use a sharpening compound while sharpening for the sharpener to be effective.

Preferably, the sharpener housing may be disassembled to permit the replacement of the shaft and sharpening tooth disposed thereon.

In a preferred embodiment of the invention, the invention comprises a saw chain sharpener for a chain saw having a saw chain disposed on a chain bar, wherein the saw chain has a plurality of cutting teeth having top and bottom surfaces, the bottom surface of the cutting teeth being closer to the chain bar than the top surfaces, the saw chain sharpener comprising a housing having left and right side walls defining a recess; a shaft having a top end and a bottom end, where the shaft is disposed inside the recess; a sharpening tooth having a top and bottom surface, where the sharpening tooth is disposed on the bottom end of the shaft; left and right lifting members movably disposed on the left and right side walls, where the lifting members are moveable to an open position before mounting the housing over the chain bar and moveable to a closed position after the housing is mounted over the saw chain; and a mounting bracket having a recess for receiving the chain bar, where the mounting bracket comprises a device for clamping the mounting bracket to the chain bar, and for removably attaching to the housing an end of the mounting bracket so as to substantially center the recess of the housing over the saw chain. As discussed above, the cutting teeth are lifted by the lifting members to a cutting position where the bottom surfaces of the cutting teeth engage the top surface of the sharpening tooth, so that the cutting teeth are bottom sharpened by running the chain saw.

Preferably, the sharpening tooth is triangularly shaped and the top surface comprises first and second triangular regions, wherein the first region engages cutting teeth disposed on a first side of the saw chain and the second region engages cutting teeth disposed on a second side of the saw chain.

A shock absorber device is preferably associated with the shaft which holds the sharpening tooth for dissipating energy delivered to the tooth during sharpening. The shock absorber device may comprise an elastic material disposed between the shaft and the housing. For example, the shaft may be embedded in a rubber ball which is itself clamped in a spherical recess formed between two halves of the assembled housing using machine screws. Alternatively, the shaft may be biased by a spring element disposed in the housing. Other methods may also be used for dissipating energy delivered to the sharpening tooth which are well known to those skilled in the art.

Preferably the housing can be easily disassembled into two halves to permit the replacement of the shaft and sharpening tooth disposed therein. The housing may be made of steel, aluminum or other suitable materials including strong plastics such as polystyrene, ABS plastics or PLEXIGLAS.

The left and right lifting members disposed on the sharpener housing which lift the chain into the sharpening position can each also include stabilizers for stabilizing the housing with respect to the bar chain. Alternatively, or in addition to the stabilizers disposed on the left and right lifting members, a device for stabilizing the housing with respect to the bar chain may be disposed directly on the housing in the form of clamping screws.

The invention also comprises a method for bottom sharpening a saw chain disposed on a chain bar of a chain saw without removing the chain from the bar, wherein the saw chain has a plurality of cutting teeth having top and bottom surfaces, and wherein the bottom surfaces of the cutting teeth are closest to the chain bar, comprising the steps of mounting a sharpener on the chain bar; lifting the chain to a sharpening position where the bottom surfaces of the cutting teeth engage the sharpener; and sharpening the cutting teeth by operating the chain saw for a time sufficient to sharpen the bottom surfaces of the cutting teeth.

The step of mounting the sharpener comprises attaching a mounting bracket to the chain bar and removably attaching the sharpener to the mounting bracket, such that the housing is disposed over the bar chain. The step of lifting the saw chain comprises supporting the saw chain using left and right lifting members movably disposed on the housing. The bottom surfaces of the chain links pass over top surfaces of the lifting members during sharpening, so that the bottom surfaces of the cutting teeth properly engage a sharpening tooth.

The method for sharpening a saw chain may also include applying a sharpening compound to the sharpening tooth while sharpening the cutting teeth, although the sharpening compound, while in some instances preferred, is not necessary for the sharpener to be effective.

The present invention also comprises a chain saw including a housing; a chain bar attached to the housing; a chain disposed on a periphery of the chain bar, where the chain comprises a plurality of cutting teeth each having a top and bottom surface, wherein the chain is movable around the periphery of the chain bar; and a sharpener for sharpening the bottom surfaces of the cutting teeth, where the bottom surfaces are sharpened by the sharpener while the chain is run around the chain bar. A motor disposed in the housing is used to move the chain around the chain bar. The motor may be electric or may be an engine powered by a combustible fuel, of the kind which are well know in the art. The sharpener is removably disposed on the chain bar, and comprises a shaft disposed in a recess of the housing; a sharpening tooth having a top surface and a bottom surface, where the sharpening tooth is disposed on a bottom end of the shaft, and where the top surface of the sharpening tooth is positioned by a lifting device to frictionally engage the bottom surface of the cutting teeth to bottom sharpen the cutting teeth when the chain saw is operated.

The advantages of the invention include, but are not limited to, providing a method and apparatus for sharpening a bottom sharpening saw chain automatically, without having to individually hand sharpen each of the cutting teeth. Accordingly, the method of the present invention comprises running the chain saw under power so that the chain passes through a sharpener removably attached to the chain bar, wherein the chain is sharpened in a matter of seconds.

Another advantage of the invention is to provide a method and apparatus for sharpening a bottom sharpening saw chain without removing the chain from the chain bar.

The chain sharpener of the present invention is light weight and portable, and can be quickly and conveniently attached to the chain bar for sharpening, and subsequently easily removed when the chain saw is used for cutting, by means of a mounting bracket which can be removably attached to the chain bar, which bracket comprises a device for quickly attaching the sharpener on the chain bar.

The chain sharpener also comprises a device for applying a sharpening compound to the cutting teeth if desired, to improve the sharpening efficiency of the sharpener.

BRIEF DESCRIPTION OF THE DRAWINGS

The invention will now be described with reference to the drawings wherein:

FIG. 9 is a perspective view of the sharpening tooth disposed at the end of the shaft FIG. 10 is a side view of the sharpening tooth and part of the shaft showing the nose angle to be pointing upward with respect to the horizontal.

FIG. 11 is a plan view showing a cutting tooth as it approaches the lifting member and the sharpening tooth as the chain is run around the chain bar.

FIG. 12 is a plan view showing the cutting tooth of FIG. 11 at the instant in time when the front portion of the cutting tooth just arrives at the front portion of the sharpening tooth.

FIG. 13 is a plan view showing the cutting tooth of FIG. 12 at the instant in time when the cutting tooth is lifted by the lifting member to a sharpening position for frictional engagement of the bottom of the cutting teeth with a top surface of the sharpening tooth.

FIG. 14 is a perspective view of a sharpening tooth in which the nose angle is shown to be angling downward from the horizontal.

Throughout the drawings, like reference numerals will be understood to refer to like parts.

DETAILED DESCRIPTION OF THE PREFERRED EMBODIMENTS

Figure 1:
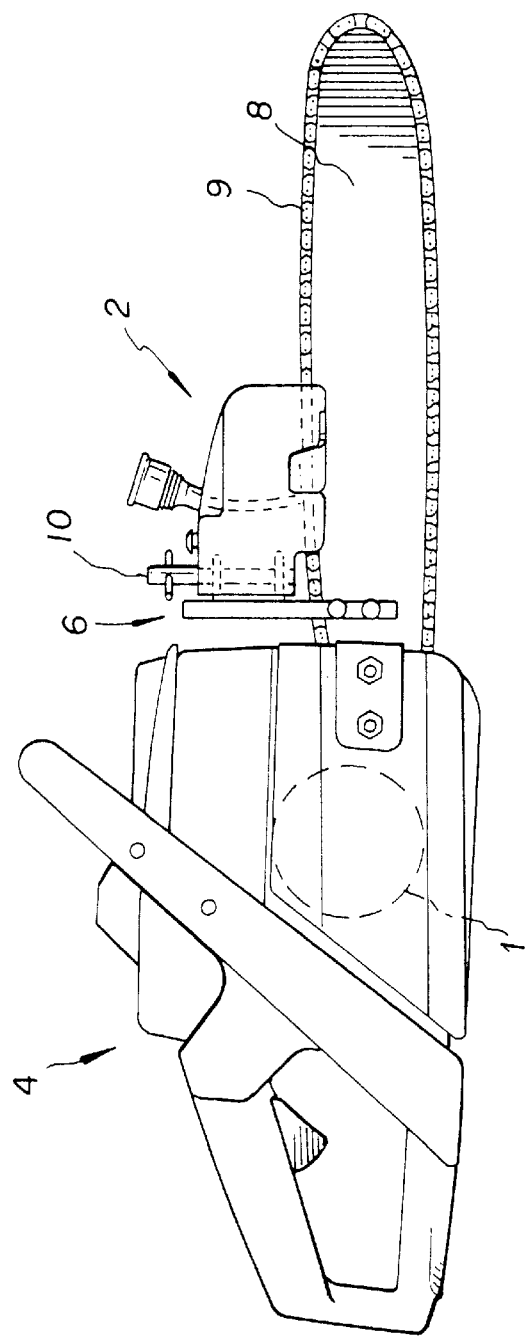
FIG. 1 illustrates a chain saw of the present invention having a mounting bracket and a first embodiment of the sharpening housing disposed on the chain bar.

In FIG. 1 the sharpener housing 2 of the present invention is shown mounted on the chain saw 4. The chain saw 4 has a motor 1 which can be an electric motor or an internal combustion engine. A bracket 6 is removably clamped to the chain bar 8 and the sharpener housing is removably attached to the bracket 6 when the chain 9 is in need of sharpening. The bracket 6 may be permanently mounted to the chain bar 8 without interfering with the cutting operation of the saw. The sharpener housing 2 can be made of any convenient material, including metals such as steel, brass or preferably aluminum to minimize the weight of the housing, or strong plastics such as polystyrene or PLEXIGLAS.

Figure 3:
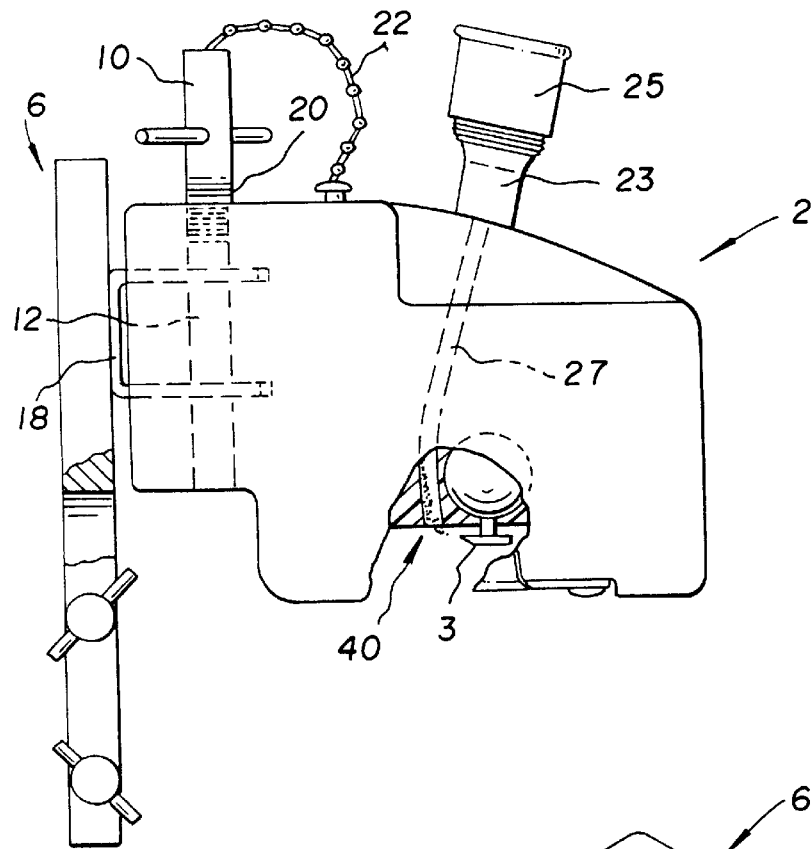
FIG. 3 shows the first embodiment of the sharpening housing attached to a first embodiment of the mounting bracket.
Figure 4:
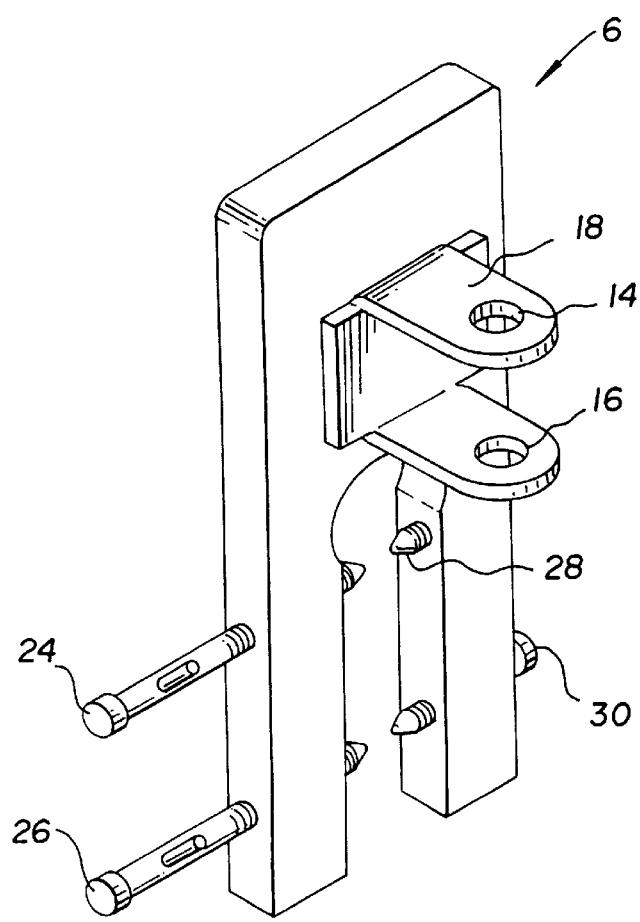
FIG. 4 is a detailed illustration of a first embodiment of a mounting bracket which is clamped to the chain bar to allow the sharpening housing to be removably attached to the chain bar.

A detailed view of the bracket 6 and sharpener housing 2 is shown in FIGS. 3 and FIGS. 4. As can be seen in FIG. 3, the sharpener housing 2 is removably attached to the bracket 6 by virtue of a pin 10 which is inserted in the through hole 12 formed in the rear portion of the sharpener housing 2. The pin 10 passes through holes 14 and 16 disposed in the U-shaped channel 18 of the bracket 6. The pin 10 is provided with a short threaded section 20 which engages a corresponding threaded section in the top of through hole 12. In this way, the sharpener housing 2 can be quickly and conveniently mounted to the chain saw whenever the chain requires sharpening, by matching the sharpener housing 2 to the bracket 6, and inserting pin 10 in the through hole 12 and through holes 14 and 16. The pin 10 can be turned a few turns to engage it with matching threads in the top of through hole 12 to prevent it from vibrating loose while the sharpener is used. A chain 22 attached between the sharpener housing 2 and the pin 10 prevents the pin from becoming lost when the sharpener is not in use. Clamping screws 24, 26, 28 and 30 are used to clamp the bracket 6 to the chain bar 8, and these screws may be made to mate with corresponding holes or depressions (not shown) disposed in the chain bar.

Figure 17:
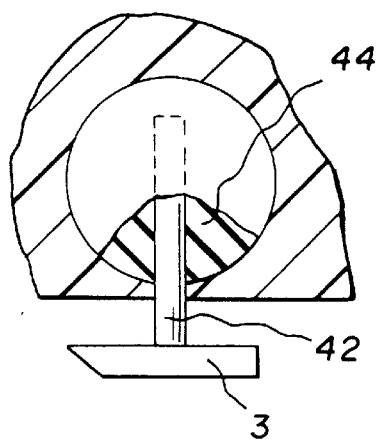
FIG. 17 is a side view of a sharpening tooth disposed on the end of a shaft, showing the shaft surrounded by an elastic material disposed in the sharpening housing.
Figure 18:
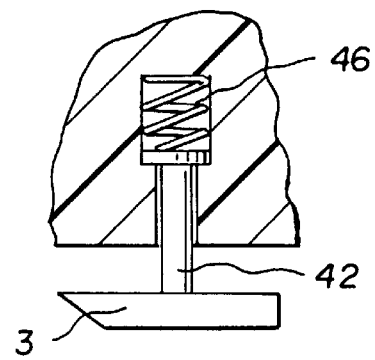
FIG. 18 is a side view of a sharpening tooth disposed on the end of a shaft, showing the shaft biased by a spring member disposed in the sharpening housing.

A sharpening tooth 3 is disposed in a cavity 40 of the sharpening housing 2. As shown in FIGS. 17 and 18, the sharpening tooth 3 is disposed on a shaft 42, and the shaft may be embedded in a shock absorbing material 44 as shown in FIG. 17, or biased by a spring 46 as shown in FIG. 18, to absorb and dissipate vibrational energy while sharpening. The shaft 42 is preferably attached to the housing 2 by means of a bolt or bolts (not shown) disposed through the top end of the shaft and through corresponding holes (not shown) in the housing in a manner well known to those skilled in the art. The sharpening tooth 3 is preferably made of steel or hardened steel, or any other convenient material of high strength, such as a ceramic, and the sharpening tooth 3 may have on at least the sharpening surface a nitride coating, such as titanium nitride, or other coating or coatings known in the art to improve the hardness of the tooth and prevent excessive wear during sharpening.

FIG. 9 shows the bottom of the sharpening tooth 3 which has a groove through which the chip drags (53' and 53" in FIG. 2 associated with the left and right cutting teeth 50' and 50") pass as the chain is sharpened.

FIGS. 10 and 14 illustrate two preferred shapes for the sharpening tooth. In FIG. 10 the nose 5 of the sharpening tooth 3 is shown to point upward at an angle $\theta$ with respect to the bottom surface 7 of the tooth 3, where $\theta$ is preferably in a range of from about 10° to about 45°. In FIG. 14 the nose 5 of the sharpening tooth 3 is shown to point downward at an angle $\alpha$ with respect to the upper surface 11 of the tooth, where $\alpha$ is preferably in a range of from about 10° to about 45°.

Figure 6:
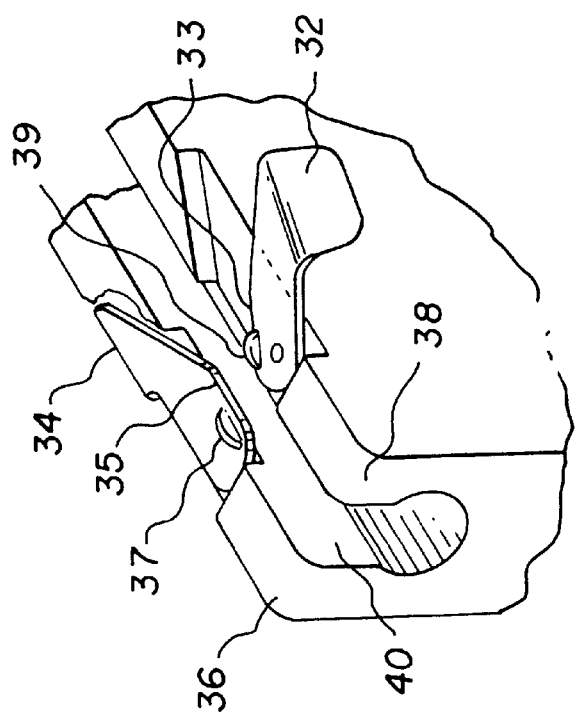
FIG. 6 is a view of the underside of the first embodiment of the sharpener housing in which the lifting members are shown disposed on side walls which,define the recess in which the sharpener tooth is disposed.
Figure 5:
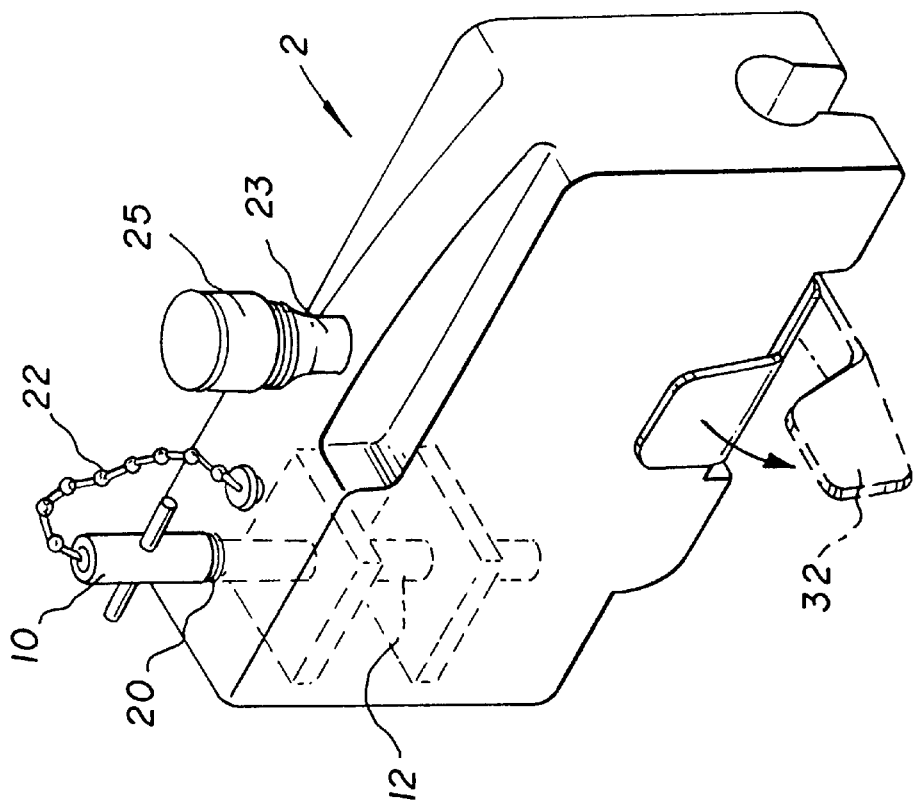
FIG. 5 is a perspective view of the first embodiment of the sharpener housing showing one lifting member which is openable in the direction of the arrow.

FIGS. 5 and 6 show left and right lifting members 32 and 34 which are movably disposed on sidewalls 36 and 38 which define the cavity 40. Before the sharpener housing 2 is mounted on the chain bar 8, lifting members 32 and 34 are pulled outward as shown in FIG. 5, such that the chain bar 8 can be received by cavity 40 and the sharpener housing 2 can be locked to the bracket 6 as shown in FIG. 1. Stabilizing portions 37 and 39 of left and right lifting members 34 and 36, respectively, stabilize the sharpening housing 2 against the chain bar 8 when the lifting members 34 and 36 are in closed positions, as the stabilizing portions 37 and 39 are flush against the left and right side surfaces 13 and 15, respectively, of the chain bar 8 when the lifting members 34 and 36 are in a closed position.

Figure 2:
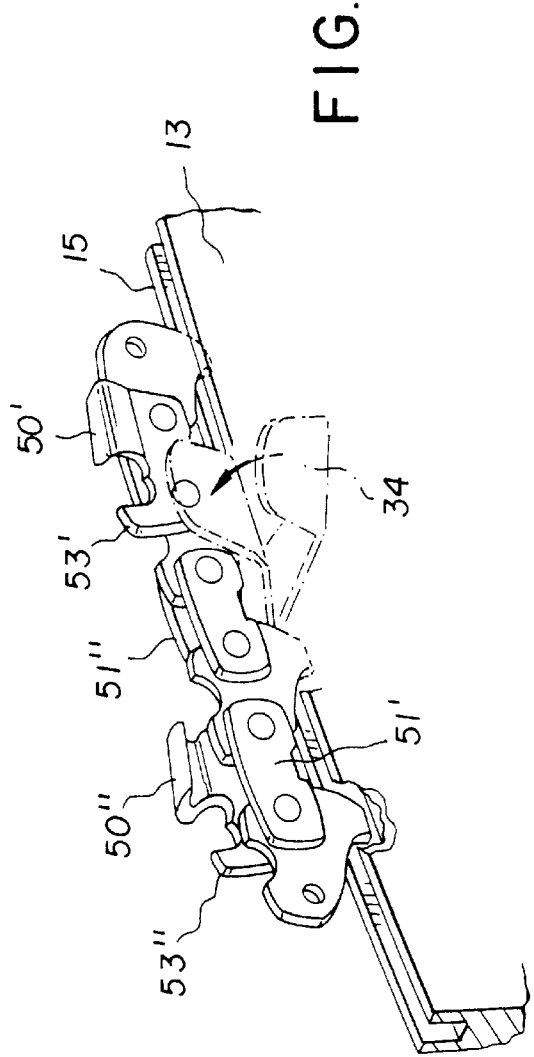
FIG. 2 is a view showing the saw chain being lifted from the chain bar when the lifting member is in a closed position.

In FIG. 2 the lifting member 34 is shown as it is moved into a closed position so as to lift the chain above the chain bar. Conventional bottom sharpening chain saw chains comprise left and right cutting teeth 50' and 50" (as viewed by the chain saw operator) alternatively disposed along the length of the chain, as shown in FIG. 2.

After the sharpening body 2 is attached to the mounting bracket 6, a slack portion of the chain 9 is pulled by the user into the cavity 40. The lifting members 32 and 34 are then moved to a closed position, as represented by lifting member 34 in FIG. 6, such that top surfaces (not shown) of inward facing portions 33 and 35 of lifting members 32 and 34, respectively, support bottom surfaces of links 51' and 51" of the chain 9 in the cavity 40, and the chain passes over the top surfaces of the inward facing portions 33 and 35 as the chain is run during sharpening. The lifting members 32 and 34 and the sharpening tooth 3 are positioned with respect to one another so that bottom portions of the cutting teeth 50' and 50" of the chain 9 shown in FIG. 13 frictionally engage the top surface 54 of the cutting tooth 3 as the chain is run under power around the chain bar.

The sharpening process of the present invention is detailed in FIGS. 11–13, which show only right cutting teeth 50" for ease of illustration. In FIG. 11, one of the cutting teeth 50" is shown traveling in the direction of the arrow as the chain is moved under power around the chain bar. FIG. 12 shows one of the cutting teeth at a time when a forward portion of the cutting tooth is just about to reach the sharpening tooth 52". Because the chain links 51' and 51" are caused to pass over top surfaces (not shown) of the inward facing portions 33 and 35 of the lifting members 32 and 34, respectively, the cutting teeth 50" are raised to a sharpening position at which the bottom portions 52" of the cutting teeth 50" frictionally engage the top portion 54 of the sharpening tooth 3 (as shown in FIG. 13) to bottom sharpen the cutting teeth 50". Only the inward facing portion 33 of lifting member 32 can be seen in FIGS. 11–13.

In FIG. 3, a device for providing a sharpening compound to the cutting teeth during sharpening is shown in the form of a reservoir 23 containing an abrasive sharpening compound. The reservoir 23 is shown disposed in a top surface of the sharpening housing 2 such that the compound can be applied, through tube 27, to an area adjacent the top surface of the sharpening tooth 3 during sharpening to improve sharpening efficiency. A cap 25, threadably engaged on reservoir 23, is used to force the sharpening compound through the tube by means of a spring (not shown) disposed inside the reservoir. The spring presses on the compound or on a piston (not shown) as the cap 25 is threaded onto the reservoir 23. The sharpening compound may be silicon or diamond dust, carborundum, or any of the other numerous grinding and sharpening compounds which are well known to one skilled in the art. While the device for providing the sharpening compound improves the sharpening efficiency of the invention, it is not necessary to the invention and may be omitted to simplify construction and operation of the device.

Figure 8:
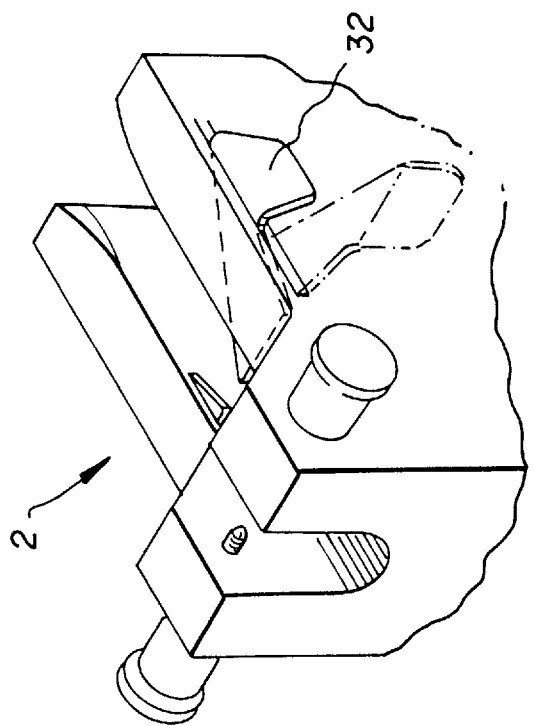
FIG. 8 is a view of the underside of the second embodiment of the sharpener housing in which the lifting members are shown disposed on side walls which define the recess in which the sharpener tooth is disposed.
Figure 7:
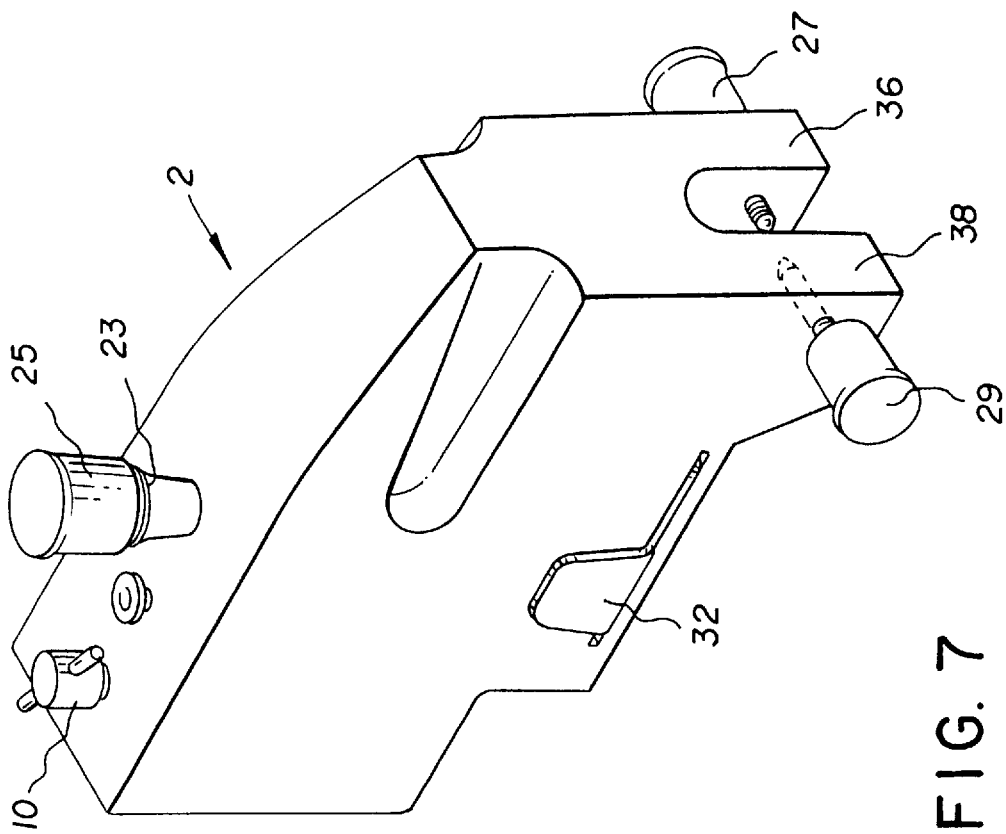
FIG. 7 illustrates a second embodiment of the sharpener housing in which stabilizing screws for stabilizing the sharpener housing on the chain bar are shown.

Another embodiment of the invention is shown in FIGS. 7 and 8 in which the sharpening housing 2 is provided with left and right stabilizing screws 27 and 29, respectively, disposed in descending front portions of the left and right side walls 36 and 38. The stabilizing screws 27 and 29 are used in place of, or in addition to, the stabilizers 37 and 39 (shown in FIG. 6) disposed on lifting members 32 and 34, to keep the front portion of the sharpening body firmly lined up with the chain bar.

Figure 15:
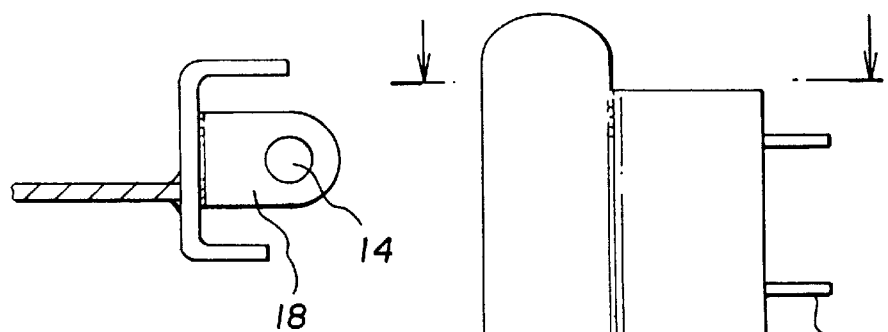
FIG. 15 is a top view of a second embodiment of a mounting bracket designed to be bolted to the chain bar for removably mounting the sharpening housing to the chain bar.
Figure 16:
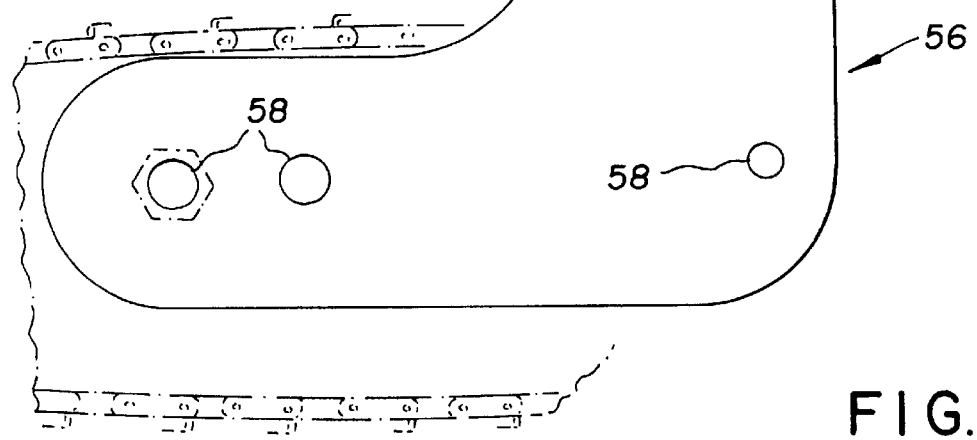
FIG. 16 is a side view of the second embodiment of a mounting bracket designed to be bolted to the chain bar for removably mounting the sharpening housing to the chain bar.

An alternative mounting bracket 56 is shown in FIG. 15 which is approximately L-shaped such that the bottom portion of the bracket can be mounted to the chain bar using bolts (not shown) disposed through holes 58 which match up with corresponding holes (not shown) bored in the chain bar. The top portion of the bracket comprises a U-shaped channel 18 identical to the channel described previously with respect to mounting bracket 6 and shown most clearly in FIG. 4. FIG. 15 is a top view of this bracket in which the through hole 14 of the U-channel 18 is shown.

Although the present invention has been described with reference to a number of preferred embodiments, it is to be understood that the invention is not limited to the details thereof. A number of possible modifications and substitutions will occur to those of ordinary skill in the art, and all such modifications and substitutions are intended to fall with the scope of the invention as defined in the appended claims.

What is claimed is:

1. A saw chain sharpener for a chain saw having a saw chain disposed on a chain bar, wherein the saw chain has a plurality of cutting teeth, each cutting tooth having a cross section which defines a crook, the crook comprising an upstanding section and a projecting section, a portion of the upstanding section lies approximately parallel to a side surface of the chain bar, the protecting section is carried by the upstanding section, at least a portion of the projecting section lies in a plane perpendicular to the side surface of the chain bar, each protecting section having a top and a bottom surface, the bottom surface of the projecting portion being closer to the chain bar than the top surface, the top surface is joined to the bottom surface by a leading edge, the angle between the leading edge and the top surface is an acute angle, the saw chain sharpener comprising:

a housing comprising a recess;

means for removably attaching the housing to the chain bar; and sharpening means disposed in said recess for sharpening the leading edge of each cutting tooth as the sharpening means is relatively moved through a position within the crook of each cutting tooth, a bottom surface of said sharpening mean positioned closer to the chain bar then a top surface of said sharpening means, wherein said top surface engages the leading edge when the chain saw is operated.

2. A saw chain sharpener for a chain saw according to claim 1 further comprising:

means for delivering a sharpening compound to said sharpening tooth during sharpening.

3. A chain saw sharpener for a chain saw according to claim 1, further comprising:

lifting means associated with the recess for lifting the cutting teeth to a sharpening position, wherein the leading edges of the cutting teeth engage the sharpening means to sharpen the leading edges of the cutting teeth as the cutting teeth are lifted by said lifting means.

4. A saw chain sharpener for a chain saw according to claim 1, further comprising:

shock absorber means disposed on said shaft for dissipating energy delivered to said sharpening tooth during sharpening.

5. A saw chain sharpener for a chain saw according to claim 4, wherein said shock absorber means comprises an elastic material disposed between said shaft and said housing.

6. A saw chain sharpener for a chain saw according to claim 1, wherein said means for removably attaching said housing to the chain bar comprises:

a mounting bracket adapted to be removably mounted to the chain bar; and means for removably attaching said housing to said mounting bracket.

7. A saw chain sharpener for a chain saw according to claim 6; wherein said mounting bracket comprises:

first and second side walls which define a channel for receiving said chain bar;

clamping means disposed in at least one of said side walls of said mounting bracket for holding said mounting bracket firmly on the chain bar.

8. A saw chain sharpener for a chain saw according to claim 6, wherein said mounting bracket comprises:
   an L-shaped lifting member adapted to be attached to one side of the chain bar.

9. A saw chain sharpener for a chain saw according to claim 1, wherein said sharpening means comprises:
   a shaft disposed in said recess;
   a sharpening tooth having a top surface and a bottom surface, wherein said sharpening tooth is disposed on a bottom end of said shaft, and wherein said top surface of said sharpening tooth is positioned to frictionally engage the the leading edges of the cutting teeth to bottom sharpen the cutting teeth when the chain saw is operated.

10. A saw chain sharpener for a chain saw according to claim 9, wherein said lifting means comprises:
    left and right lifting members movably disposed on left and right side walls of said housing, wherein the chain is lifted by said lifting members to the leading edges of the cutting teeth to frictionally engage said top surface of said sharpening tooth as the chain moves along the chain bar.

11. A saw chain sharpener for a chain saw according to claim 9, wherein said housing is disassemblable to permit the replacement of said shaft and sharpening tooth disposed therein.

12. A saw chain sharpener for a chain saw according to claim 9, wherein said sharpening tooth is made of hardened steel.

13. A saw chain sharpener for a chain saw having a saw chain disposed on a chain bar, wherein the saw chain has a plurality of cutting teeth, each cutting tooth having a cross section which defines a crook, the crook comprising an upstanding section and a projecting section, a portion of the upstanding section lies approximately parallel to a side surface of the chain bar, the projecting section is carried by the upstanding section, at least a portion of the projecting section lies in a plane perpendicular to the side surface of the chain bar, each projecting section having a top and a bottom surface, the bottom surface of the projecting portion being closer to the chain bar than the top surface, the top surface being joined to the bottom surface by a leading edge, the angle between the leading edge and the top surface being an acute angle, the saw chain sharpener comprising:
    a housing having left and right side walls defining a recess;
    a shaft having a top end and a bottom end, wherein said shaft is disposed inside of said recess and fastened at the top end to the housing;
    a sharpening tooth having a top and bottom surface, wherein said sharpening tooth is disposed on the bottom end of said shaft; and
    a mounting bracket having a recess for receiving the chain bar, wherein said mounting bracket comprises means for clamping said mounting bracket to said chain bar, and wherein said housing is removably attachable to an end of said mounting bracket so as to substantially center said recess of said housing over said saw chain;
    wherein said sharpening tooth is positioned at a cutting position so that said leading edge of each cutting tooth engages said top surface of said sharpening tooth as the sharpening tooth is relatively moved through a position within the crook of each cutting tooth, to sharpen the leading edges of the cutting teeth by running the chain saw and wherein said bottom surface of said sharpening tooth is located closer to said chain bar than said top surface of said sharpening tooth.

14. A saw chain sharpener according to claim 13 further comprising:
    means for delivering a sharpening compound to said sharpening tooth during sharpening.

15. A saw chain sharpener according to claim 13, wherein said sharpening tooth is generally triangularly shaped and said top surface comprises first and second triangular regions, wherein said first region engages cutting teeth disposed on a first side of the saw chain and a second region engages cutting teeth disposed on a second side of the saw chain.

16. A saw chain sharpener according to claim 13, wherein said housing is disassemblable to permit the replacement of said shaft and sharpening tooth disposed therein.

17. A saw chain sharpener according to claim 13, wherein said left and right lifting members each comprise means for stabilizing said housing with respect to said bar chain.

18. A saw chain sharpener according to claim 13, wherein means for stabilizing said housing with respect to the bar chain are disposed on said housing.

19. A saw chain sharpener according to claim 13, wherein said sharpening tooth is made of hardened steel.

20. A chain saw sharpener according to claim 13, further comprising:
    left and right lifting members disposed movably on said left and right side walls, wherein said lifting members are rotatable to an open position before mounting said housing over the chain bar and rotatable to a closed position after said housing is mounted over the saw chain;
    wherein the cutting teeth are liftable by the lifting members to a cutting position so that the leading edges of the cutting teeth engage said top surface of said sharpening tooth, to sharpen the leading edges of the cutting teeth by running the chain saw.

21. A saw chain sharpener according to claim 13, further comprising:
    shock absorber means disposed on said shaft for dissipating energy delivered to said sharpening tooth during sharpening.

22. A saw chain sharpener according to claim 21, wherein said shock absorber means comprises an elastic material disposed between said shaft and said housing.

23. A saw chain sharpener according to claim 21, wherein said shock absorber means comprises a spring element disposed in said housing at the top end of said shaft.

24. A method for bottom sharpening a saw chain disposed on a chain bar of a chain saw without removing the chain from the bar, wherein the saw chain has a plurality of cutting teeth, each cutting tooth having a cross section which defines a crook, the crook comprising an upstanding section and a protecting section, a portion of the upstanding section lies approximately parallel to a side surface of the chain bar, the projecting section is carried by the upstanding section, at least a portion of the projecting section lies in a plane perpendicular to the side surface of the chain bar, each projecting section having a top and a bottom surface, the bottom surface of the projecting portion being closer to the chain bar than the top surface, the top surface is joined to the bottom surface by a leading edge, the angle between the leading edge and the top surface is an acute angle, the method comprising the steps of:
    mounting a sharpener on the chain bar; and
    sharpening the cutting teeth by operating the chain saw to relatively move the sharpener through a position within the crook of each cutting tooth, a bottom surface of the sharpener being located closer to the chain bar than a top surface.

25. A method for sharpening a saw chain according to claim 24, wherein said step of mounting the sharpener comprises:

mounting a housing over the bar chain, wherein said housing contains a sharpening tooth.

26. A method for sharpening a saw chain according to claim 24, wherein said step of lifting the saw chain comprises supporting the saw chain using left and right lifting members movably disposed on said housing.

27. A method for sharpening a saw chain according to claim 24, wherein said step of mounting a sharpener on the chain bar comprises the steps of:

attaching a mounting bracket to the chain bar; and removably attaching said sharpener to said mounting bracket.

28. A method for sharpening a saw chain according to claim 24 further comprising the step of:

applying a sharpening compound to the sharpening tooth while sharpening the cutting teeth.

29. A method for sharpening a chain saw according to claim 24, further comprises:

lifting the chain to a sharpening position whereby the leading edges of the cutting teeth engage the sharpener;

wherein in the sharpening step includes sharpening the cutting teeth while the chain is lifted in the lifting step.

30. A chain saw comprising:

a housing;

a chain bar having a periphery attached to said housing;

a motor disposed in said housing;

a chain disposed on the periphery of said chain bar, wherein said chain comprises a plurality of cutting teeth, each cutting tooth having a cross section which defines a crook the crook comprising an upstanding section and a projecting section, a portion of the upstanding section lies approximately parallel to a side surface of the chain bar, the projecting section is carried by the upstanding section, at least a portion of the protecting section lies in a plane perpendicular to the side surface of the chain bar, each protecting section having a top and a bottom surface, the bottom surface of the projecting portion being closer to the chain bar than the top surface, the top surface is joined to the bottom surface by a leading edge, the angle between the leading edge and the top surface is an acute angle, and wherein said chain is movable around said periphery of said chain bar;

a sharpener disposed on said chain bar positioned to sharpen said leading edge of each cutting tooth, wherein said leading edges of said cutting teeth are sharpened by said sharpener by relatively moving the sharpener through the crook of each cutting tooth while said chain is run around said chain bar powered by said motor.

31. A chain saw according to claim 30 further comprising lifting means for lifting the cutting teeth to a sharpening position.

32. A chain saw according to claim 31, wherein said sharpener comprises:

a shaft disposed in a recess of said housing;

a sharpening tooth having a top surface and a bottom surface, wherein said sharpening tooth is disposed on a bottom end of said shaft, and wherein said top surface of said sharpening tooth is positioned by said lifting means to frictionally engage the leading edges of the cutting teeth to bottom sharpen the cutting teeth when the chain saw is operated.

* * * * *